US012052230B2

United States Patent
Bean et al.

(10) Patent No.: US 12,052,230 B2
(45) Date of Patent: Jul. 30, 2024

(54) MACHINE LEARNING TECHNIQUES FOR OBJECT AUTHENTICATION

(71) Applicant: STOCKX LLC, Detroit, MI (US)

(72) Inventors: Samuel Bean, Ferndale, MI (US); Dominic Vena Roberts, II, Detroit, MI (US); Blaine Dietrich, Ferndale, MI (US); Jason Prasad, Berkley, MI (US); Shervin Moghaddam, Los Gatos, CA (US); Mats Nilsson, Kentfield, CA (US); Douglas Brown, Royal Oak, MI (US)

(73) Assignee: STOCKX LLC, Detroit, MI (US)

( * ) Notice: Subject to any disclaimer, the term of this patent is extended or adjusted under 35 U.S.C. 154(b) by 276 days.

(21) Appl. No.: 17/660,822

(22) Filed: Apr. 26, 2022

(65) Prior Publication Data
US 2022/0353273 A1 Nov. 3, 2022

Related U.S. Application Data

(60) Provisional application No. 63/183,309, filed on May 3, 2021.

(51) Int. Cl.
*H04L 29/06* (2006.01)
*G06N 5/04* (2023.01)
(Continued)

(52) U.S. Cl.
CPC .............. *H04L 63/08* (2013.01); *G06N 5/04* (2013.01); *G06N 20/20* (2019.01); *H04L 63/123* (2013.01)

(58) Field of Classification Search
None
See application file for complete search history.

(56) References Cited

U.S. PATENT DOCUMENTS 9,053,491 B2 6/2015 Platek et al.
9,123,067 B2 9/2015 Deyle et al.
(Continued)

FOREIGN PATENT DOCUMENTS

WO 2019122271 6/2019

OTHER PUBLICATIONS

DAS, Best Practices for Dealing with Concept Drift, Available Online at: https://neptune.ai/blog/concept-drift-best-practices, Nov. 8, 2021, 11 pages.
(Continued)

*Primary Examiner* — Bradley W Holder
(74) *Attorney, Agent, or Firm* — Kilpatrick Townsend & Stockton LLP (57) ABSTRACT

Systems and methods for authenticating objects associated with online activities are provided. For a target object involved in online activities, an authentication system accesses data associated with the target object and generates a featurized dataframe for the target object by processing the data associated with the target object. The authentication system further applies a machine learning model to the featurized dataframe to determine an authenticity indicator for the target object and assigns the target object to an authentication stream according to the authenticity indicator determined. Based on the results returned from the assigned authentication stream, the online activities involving the target object may be blocked or permitted.

14 Claims, 7 Drawing Sheets

(51) Int. Cl.
*G06N 20/20* (2019.01)
*H04L 9/40* (2022.01)

(56) References Cited

U.S. PATENT DOCUMENTS

| | | | |
|---|---|---|---|
| 2016/0274241 A1* | 9/2016 | Gentry | G01S 19/03 |
| 2017/0032285 A1 | 2/2017 | Sharma et al. | |
| 2020/0097768 A1* | 3/2020 | Freese | H04L 9/085 |
| 2020/0225964 A1* | 7/2020 | Soman | H04L 63/105 |
| 2020/0402054 A1 | 12/2020 | Manjunath et al. | |
| 2021/0256310 A1* | 8/2021 | Roberts | G06N 20/00 |

OTHER PUBLICATIONS

Harel et al., Concept Drift Detection Through Resampling, Proceedings of the 31st International Conference on International Conference on Machine Learning, vol. 32, Available Online at: http://proceedings.mlr.press/v32/harel14.pdf, Jun. 2014, 9 pages.

Jain, Covariate Shift-Unearthing Hidden Problems in Real World Data Science, Available Online at: https://www.analyticsvidhya.com/blog/2017/07/covariate-shift-the-hidden-problem-of-real-world-data-science/, Jul. 10, 2017, 12 pages.

Lu et al., Learning Under Concept Drift: A Review, IEEE Transactions on Knowledge and Data Engineering, vol. 31, No. 12, Oct. 18, 2018, 18 pages.

Thomas et al., Productionizing Machine Learning: From Deployment to Drift Detection, Available Online at: https://databricks.com/blog/2019/09/18/productionizing-machine-learning-from-deployment-to-drift-detection.html, Sep. 18, 2019, 7 pages.

Zliobaite et al., An Overview of Concept Drift Applications, Big data analysis: new algorithms for a new society. Jan. 2016, 24 pages.

International Application No. PCT/US2022/071941 , International Search Report and Written Opinion, mailed on Jul. 29, 2022, 11 pages.

\* cited by examiner

MACHINE LEARNING TECHNIQUES FOR OBJECT AUTHENTICATION

CROSS-REFERENCE TO RELATED APPLICATIONS

This claims priority to U.S. Provisional Application No. 63/183,309, filed on May 3, 2021, which is hereby incorporated in its entirety by this reference.

TECHNICAL FIELD

Certain aspects and features relate to artificial intelligence. More specifically, but not by way of limitation, the disclosure relates to machine learning techniques for emulating intelligence that are trained for authenticating or pre-checking authenticity of objects associated with online activities.

BACKGROUND

As network connections become ubiquitous, more and more data and services are provided online so that the services can be accessed instantly and conveniently. Oftentimes, online activities involve an object, such as a file being uploaded to an online platform, a digital document being transmitted from a sender to a receiver, an audio or video file shared among online users, or other objects being transferred from one user to another through online operations.

As the Internet allows users to stay anonymous and hide or obfuscate actual location information when performing online operations, hackers or malicious users have been trying to take advantage of this unique nature of the Internet to launch attacks or gain access to the online system using objects that contain virus or are different what the users claim to be. For example, an attacker may upload a virus-containing file to an online file-sharing system to spread the virus to the system and other users' computer.

In another example, objects (e.g., a video file, a music clip, or other objects such as products) being exchanged through an online platform may be an object that contain different content than what is being claimed, for example, in the title, in the description, and so on. The exchange of inauthentic objects or fake products leads to the waste of resources including network resources and computing resources. It is thus important to authenticate the object involved in the online activities.

SUMMARY

Various aspects of the present disclosure involve machine learning techniques for authenticating objects associated with online activities. In one example, a method includes accessing data associated with a target object involved in online activities, generating a featurized dataframe for the target object by processing the data associated with the target object; applying a machine learning model to the featurized dataframe to determine an authenticity indicator for the target object, the authenticity indicator indicating a level of authenticity of the target object; assigning the target object to an authentication stream among a plurality of authentication streams according to the authenticity indicator determined by the machine learning model; updating the authenticity indicator according to results returned from the assigned authentication stream; and causing the online activities involving the target object to be blocked or permitted according to the authenticity indicator.

In another example, a system includes one or more processing devices and a non-transitory computer-readable storage medium communicatively coupled to the processing device. The one or more processing devices are configured to execute program code stored in the non-transitory computer-readable storage medium and thereby perform operations. The operations include accessing data associated with a target object involved in online activities; generating a featurized dataframe for the target object by processing the data associated with the target object; applying a machine learning model to the featurized dataframe to determine an authenticity indicator for the target object, the authenticity indicator indicating a level of authenticity of the target object, assigning the target object to an authentication stream among a plurality of authentication streams according to the authenticity indicator determined by the machine learning model; updating the authenticity indicator according to results returned from the assigned authentication stream; and causing the online activities involving the target object to be blocked or permitted according to the authenticity indicator.

In yet another example, a non-transitory computer-readable storage medium storing executable program code configured to cause a processor to perform operations. The operations include accessing data associated with a target object involved in online activities; generating a featurized dataframe for the target object by processing the data associated with the target object; applying a machine learning model to the featurized dataframe to determine an authenticity indicator for the target object, the authenticity indicator indicating a level of authenticity of the target object; assigning the target object to an authentication stream among a plurality of authentication streams according to the authenticity indicator determined by the machine learning model; updating the authenticity indicator according to results returned from the assigned authentication stream; and causing the online activities involving the target object to be blocked or permitted according to the authenticity indicator.

BRIEF DESCRIPTION OF THE DRAWINGS

Aspects and features of the various examples will be more apparent by describing examples with reference to the accompanying drawings, in which.

DETAILED DESCRIPTION

While certain examples are described herein, these examples are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

The disclosure relates to machine learning techniques for authenticating or pre-checking the authenticity of objects associated with online activities. Because fake or malicious objects pose security threat and/or efficiency reductions to online system and manual authentication for every object involved in online activities may delay the response time of the system, the present techniques provide a mechanism for applying a machine-learning based pre-check pipeline to data associated with an object to determine whether the object is authentic or additional authentication is necessary for the object. The object associated with online activities that can be authenticated may be a digital object (e.g., a document file, a video clip, or a music file) uploaded, transmitted, or shared among users, or a physical object being transferred from one user to another user through online activities. In an example, a machine-learning model of the pre-check pipeline may leverage a large corpus of data associated with other objects that were previously verified or authenticated. For example, the corpus of data associated with other objects may be used to train the machine-learning model to identify certain object types or formats, certain senders, or certain receivers that may require additional authentication scrutiny. The result of the pre-check pipeline may be providing authenticity indicators to objects associated with the online activities, where the indicators indicate whether further verification is desirable for that object or provide sorting or classifying information for the objects.

In some examples, the indicators provided to the objects may include an indication of a greater or lesser risk of the objects being inauthentic. Each indication of risk may be treated with varying scrutiny during further authentication techniques based on the risk indicator. For example, for digital objects, a higher risk indication may lead to the object being examined by a more complex process, such as a process involving advanced machine learning models, whereas a low-risk indicator may result in the object being checked via its metadata for accuracy before being released for actions specified through the online activities, such as uploading, transmission, etc. For physical objects, a highest risk indication may result in a more rigorous authentication process, while a very low risk indicator may include only a spot check that verifies the condition of the transacted product. Further, manual authenticators with greater experience may perform further authentication on the higher risk indications, while authenticators with less experience may perform further authentication on the lower risk indications.

As described herein, certain aspects provide improvements to security and efficiency of online platforms by detecting authenticity of objects involved in online activities using machine learning techniques. As discussed above, the online nature of the transactions or operations involving objects makes the authenticity of an object hard to verify leaving room for malicious actions using fake or virus-containing objects. The machine-learning based authenticity detection techniques disclosed herein allow the authenticity of objects to be detected or pre-checked before using more time-consuming and resource-consuming processes, such as manual checking processes or processes using more advanced and complicated techniques. This allows the authenticity of the objects to be verified in less time than existing techniques (thereby increasing the response time of the system) and with higher accuracy (because a large set of data associated with the objects can be considered by the machine learning model). These benefits may also increase the security of the system and reduce resource consumption including network and computing resources.

Figure 1:
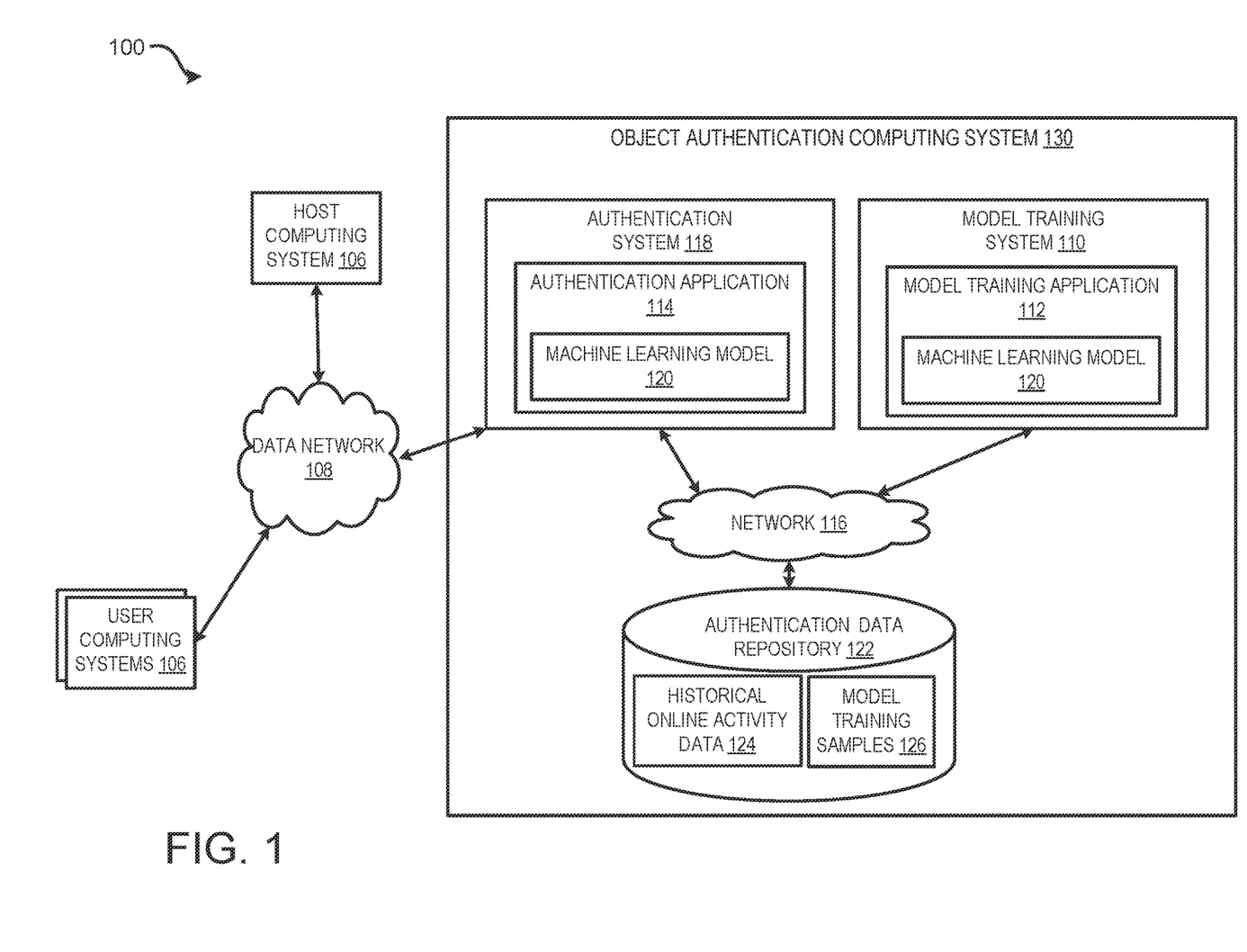
FIG. 1 is a block diagram depicting an example of a computing environment in which a machine learning model is used to authenticate or pre-check the authenticity objects associated with online activities, according to certain aspects of the present disclosure.

FIG. 1 is a block diagram depicting an example of a computing environment in which machine learning techniques are used to authenticate or pre-check objects associated with online activities, according to certain aspects of the present disclosure. FIG. 1 depicts examples of hardware components of an object authentication computing system 130, according to some aspects. The object authentication computing system 130 can include a model training system 110 for building and training a machine learning model 120. The object authentication computing system 130 can further include an authentication system 118 for performing an authenticity assessment for a given object using the trained machine learning model 120.

The model training system 110 can include one or more processing devices that execute program code, such as a model training application 112. The model training application 112 can execute one or more processes to train and optimize a machine learning model for predicting authenticity indicators for objects based on data associated with the objects. In some aspects, the model training application 112 can build and train a machine learning model 120 utilizing model training samples 126 generated from historical online activity data 124. The model training samples 126 can include multiple training vectors consisting of training features associated with objects and authenticity labels corresponding to the training features. The model training samples 126 can be stored in one or more network-attached storage units on which various repositories, databases, or other structures are stored, such as authentication data repository 122.

The authentication system 118 can include one or more processing devices that execute program code, such as an authentication application 114. The authentication application 114 can execute one or more processes to utilize the machine learning model 120 trained by the model training application 112 to predict authenticity indicators of objects based on input features associated with the object.

Furthermore, the object authentication computing system 130 can communicate with various other computing systems, such as a host computing system 104. For example, the host computing system 104 may send authenticity assessment queries to the authentication system 118 to authenticate objects involved in online activities performed through the host computing system 104. The host computing system 104 may also interact with user computing systems 106 via one or more data networks 108 to facilitate interactions between users of the user computing systems 106 and interactive computing environments provided by the host computing systems 104.

A host computing system 104 can include any computing device or group of computing devices operated by a provider of products or services. The host computing system 104 can include one or more server devices. The host computing system 104 can also execute instructions that provide an interactive computing environment accessible to user computing systems 106. Examples of the interactive computing environment include a mobile application specific to a particular host computing system 104, a web-based application accessible via a computer or a mobile device, etc.

In some examples, the interactive computing environment can provide one or more graphical interfaces. The graphical interfaces can be used by a user computing system 106 to access various functions of the interactive computing environment. For instance, the interactive computing environment may transmit data to and receive data from a user computing system 106 to shift between different states of the interactive computing environment, where the different states allow one or more electronics transactions between the user computing system 106 and the host computing system 104 to be performed.

In some examples, a host computing system 104 may have other computing resources associated therewith, such as server computers hosting and managing virtual machine instances for providing cloud computing services, server computers hosting and managing online storage resources for users, server computers for providing database services, and others. The interaction between the user computing system 106 and the host computing system 104 may be performed through graphical user interfaces presented by the host computing system 104 to the user computing system 106, or through an application programming interface (API) calls or web service calls.

A user computing system 106 can include any computing device or other communication device operated by a user, such as a consumer or a customer. The user computing system 106 can include one or more computing devices, such as laptops, smartphones, and other personal computing devices. In various examples, the user computing system 106 can allow a user to access certain online services provided by a host computing system 104 or other computing resources, to engage in online transactions with a host computing system 104 or other user computing system 106, to obtain access to computing or storage resources hosted by the host computing system 104, etc.

For instance, the user can use the user computing system 106 to engage in an electronic transaction with a host computing system 104 or another user computing system 106 via an interactive computing environment provided by the host computing system 104. An electronic transaction between the user computing system 106 and the host computing system 104 can include, for example, the user computing system 106 being used to request online storage resources managed by the host computing system 104, acquire cloud computing resources (e.g., virtual machine instances), and so on. An electronic transaction between the user computing system 106 and the host computing system 104 or another user computing system 106 can also include, for example, querying online product information provided via the interactive computing environment, submitting a purchase request to the host computing system 104 via the interactive computing environment, submitting a sale request to the host computing system 104 via the interactive computing environment, operating an electronic tool within an interactive computing environment hosted by the host computing system (e.g., a content-modification feature, etc.).

In some aspects, an online transaction or activity involves one or more objects. Depending on the nature of the transaction or activity, the involved object may be a digital object or a physical object. The transaction may include uploading a file to an online platform provided by the host computing system 106, transmitting a digital document from a sender to a receiver through the host computing system 106, sharing an audio or video file among multiple users through the host computing system 106, or transferring the ownership of a product from one user to another through an online marketplace provided by the host computing system 106.

A user computing system 106 can be used to request transactions or other activities through the interactive computing environment provided by the host computing system 104, which can selectively permit the online transactions or activities so that the transactions can complete or block the transactions to prevent them from being completed. Based on the requests, the host computing system 104 can collect data associated with the object, the user, and the transaction, and communicate with the authentication system 118 for authenticity assessment. Based on the authenticity indicator generated by the authentication system 118, the host computing system 104 can determine whether to permit or block the online transaction or activities.

In a simplified example, the system depicted in FIG. 1 can configure a machine learning model 120 to be used for accurately determining or pre-checking authenticity indicators for objects using features of the objects. The machine learning model 120 can be a Gradient Boosted Tree (GBT), a neural network, or other types of models. A feature can be any variable predictive of authenticity risk that is associated with an object. Examples of the features used for predicting the authenticity risk associated with an object include, but are not limited to, the type of the objects (e.g., formats of digital file objects, categories of physical objects, brands of product objects), size of the objects (e.g., file size or physical size and weight), features indicative of prior actions or transactions involving fake or malicious objects by the same user (e.g., past blocked or denied transactions involving the same users as a transmitter/seller or a receiver/buyer due to detected fake or malicious objects), and so on.

These features can be generated for the object and utilized by the authentication system 118 to authenticate or pre-check the authenticity of the object, thereby permitting or blocking the online activities associated with the object. For example, if it is determined that the predicted authenticity risk indicator is lower than a threshold risk indicator value, then the host computing system 104 can allow the online activities or transactions to go through or have the object being briefly checked before permitting the online transactions to proceed. As a result, the user computing device may be provided with access permission to certain content hosted on the host computing system 104, such as webpages indicating the status of the transaction or online activities, user interfaces showing the information associated with the object, and/or user interfaces configured for operating on the object such as modifying certain aspects of the object or obtaining (e.g., downloading) the object. The host computing system 104 associated with the service provider can also allocate resources (e.g., computing, storage or other types of resources) to the user and provide a dedicated web address for the allocated resources to the user computing system 106. With the proper credentials and/or the dedicated web address, the user computing system 106 can establish a secure network connection to the computing environment hosted by the host computing system 104 and access the resources via invoking API calls, web service calls, HTTP requests, or other proper mechanisms. If it is determined that the predicted authenticity risk indicator is higher than a threshold risk indicator value, then the online activities are blocked. For online transactions involving physical objects, blocking the transaction may include, for example, canceling the transaction, not releasing the product to the seller for shipment, and so on.

Each communication within the operating environment 100 may occur over one or more data networks, such as a data network 108, a private data network 116, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices depicted in FIG. 1 is provided for illustrative purposes. Different numbers of devices may be used. For example, while certain devices or systems are shown as single devices in FIG. 1, multiple devices may instead be used to implement these devices or systems. Similarly, devices or systems that are shown as separate may be instead implemented in a single device or system. For example, while FIG. 1 shows that the host computing system 106 is separate from the authentication system 118, the authentication system 118 may be part of the host computing system 106. In other words, the host computing system 106 may be configured to implement the authentication application to authenticate objects involved in the online activities performed through the host computing system 106. As such, the machine-learning based authentication may be integrated into a host computing system of the online platform or provided as a separate service as shown in FIG. 1. Likewise, the model training system 110 and the authentication system 118, shown as separate in FIG. 1, may be implemented in a single device or system. The authentication data repository 122 may be implemented on separate storage devices or systems. For instance, the historical online activity data 124 may be stored on a storage device or system different from the model training samples 126.

Figure 2:
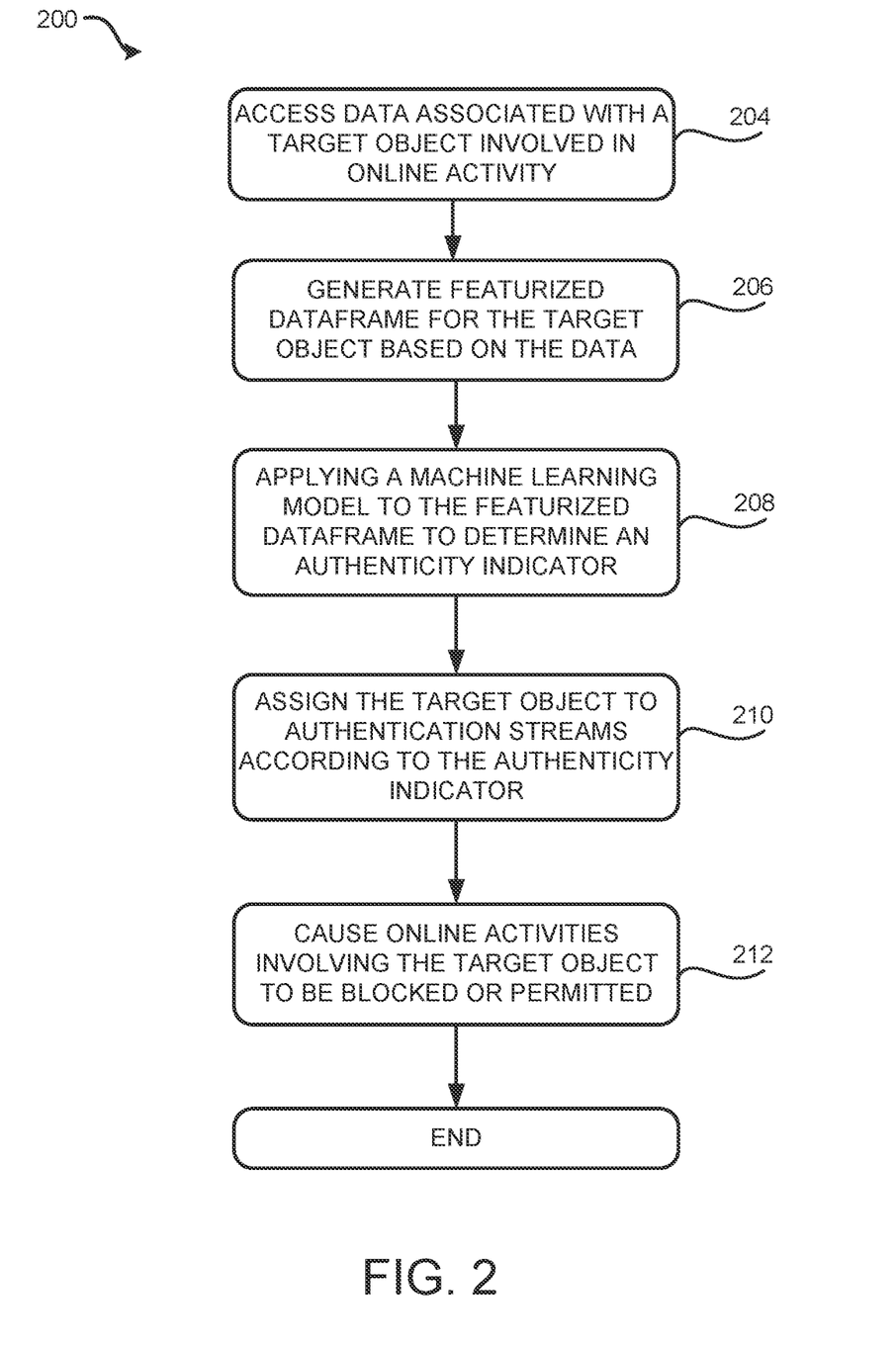
FIG. 2 is a flow chart depicting an example of a process for utilizing a machine learning model to authenticate or pre-check the authenticity of objects associated with online activities, according to certain aspects of the present disclosure.

FIG. 2 is a flow chart depicting an example of a process 200 for utilizing a machine learning model to authenticate or pre-check the authenticity of objects associated with online activities. One or more computing devices (e.g., the authentication system 118) implement operations depicted in FIG. 2 by executing suitable program code (e.g., the authentication application 114). For illustrative purposes, the process 200 is described with reference to certain examples depicted in the figures. Other implementations, however, are possible.

At operation 204, the process 200 involves accessing data associated with a target entity involved in online activities. The data may include information associated with the online activity or transaction, the sender of the object, a receiver of the target object, the information of the target object itself, or any combination thereof.

At operation 206, the process 200 involves generating featurized dataframe for the target object by processing the data associated with the target object. For example, the data associated with the target object may be featurized by applying text featurization models such as word2vec models on words describing the target object or associated online activities. This generates a featurized dataframe that includes a set of vectors representing the data associated with the target object.

At operation 208, the process 200 involves applying a machine learning model to the featurized dataframe to determine an authenticity indicator for the target object. The authenticity indicator indicates the level of authenticity of the target object. In some examples, the authenticity indicator output by the machine learning model may further include a confidence level, such as an indication of the confidence associated with the authenticity indicator. Detailed examples of training and using the machine learning model will be presented below with regard to FIGS. 3-5.

At operation 210, the process 200 involves assigning the target object to one of multiple authentication streams according to the authenticity indicator determined by the machine learning model. For example, objects with an authentic prediction and a high confidence level may be assigned to an authentication stream with limited further verification processing, while objects with a fake prediction and a high or low confidence level may be assigned to an authentication stream with high levels of verification scrutiny.

At block 212, the process 200 involves causing the online activities involving the target object to be blocked or permitted according to the results returned from the assigned authentication stream. The authenticity indicator may be updated according to the returned results. In one example, the authenticity indicator can be utilized to determine whether to permit or block the online activities involving the target object. As discussed above with regard to FIG. 1, the object authentication computing system 130 can communicate with the host computing system 104, which may send authenticity assessment queries to the authentication servers 118 to request authenticity assessment. The host computing system 104 may be associated with technological providers, such as cloud computing providers, online storage providers, or online marketplace providers such as e-commerce providers, online retailers, or other types of organizations. The host computing system 104 may be implemented to provide interactive computing environments for customers to access various services offered by these service providers. Customers can utilize user computing systems 106 to access the interactive computing environments thereby accessing the services provided by these providers.

For example, a customer can submit a request to conduct a transaction through the interactive computing environment using a user computing system 106. The transaction may be, for example, uploading a file to the host computing system 104, transmitting data to another user computing system 106 through the host computing system 104, transferring a product to another user through the interactive computing environment provided by the host computing system 104, and so on. Based on the request, the host computing system 104 can generate and submit an authenticity assessment query for the object involved in the requested transaction to the authentication system 118. The authenticity assessment query can include, for example, an identity of the object and other information associated with the object that can be utilized to generate features (e.g., featurized dataframe) for the object. The authentication system 118 can perform an authenticity assessment based on features generated for the object and return the predicted authenticity indicator to the host computing system 104.

Based on the received authenticity indicator, the host computing system 104 can determine whether to permit the transaction to proceed or to block the transaction. In some examples, the host computing system 104 may initiate a further authentication process based on the authenticity indicator. For example, for digital objects, a higher risk indication may lead to the object being examined by a more complexed process, such as a process involving advanced machine learning model whereas a low-risk indicator may result in the object being checked via its metadata for accuracy before being released for actions specified through the online activities, such as uploading, transmission, etc. For physical objects, a highest risk indication may result in a complete manual authentication process, while a very low risk indicator may include only a spot check that verifies the condition of the transacted product. Further, manual authenticators with greater experience may perform further authentication on the higher risk indications, while authenticators with less experience may perform further authentication on the lower risk indications.

If it is determined (based on the machine learning output or the additional authentication process) that the level of risk for the object being inauthentic is too high (e.g., higher than a threshold), the host computing system 104 can block the transaction involving the object on the interactive computing environment. For online transactions involving physical objects, blocking the transaction may include, for example, canceling the transaction, not releasing the product to the seller for shipment, and so on. Conversely, if it is determined (based on the machine learning output or the additional authentication process) that the level of risk for the object being inauthentic is low (e.g., lower than a threshold), the host computing system 104 can permit the transaction to proceed on the interactive computing environment. As a result, the involved object may be uploaded, transmitted, transferred, and so on.

In the following, an example of using machine learning techniques for authenticating physical objects (e.g., products) associated with online transactions is described. However, this example should not be construed as limiting. The same techniques can be used for authenticating digital objects associated with online transactions or activities as discussed above. In addition, while the machine learning techniques are described as being used as a pre-check mechanism for authentication, the authenticity indicator output by the machine learning model may be used to determine the authenticity of the object according to the confidence level associated with the authenticity indicator.

Figure 3:
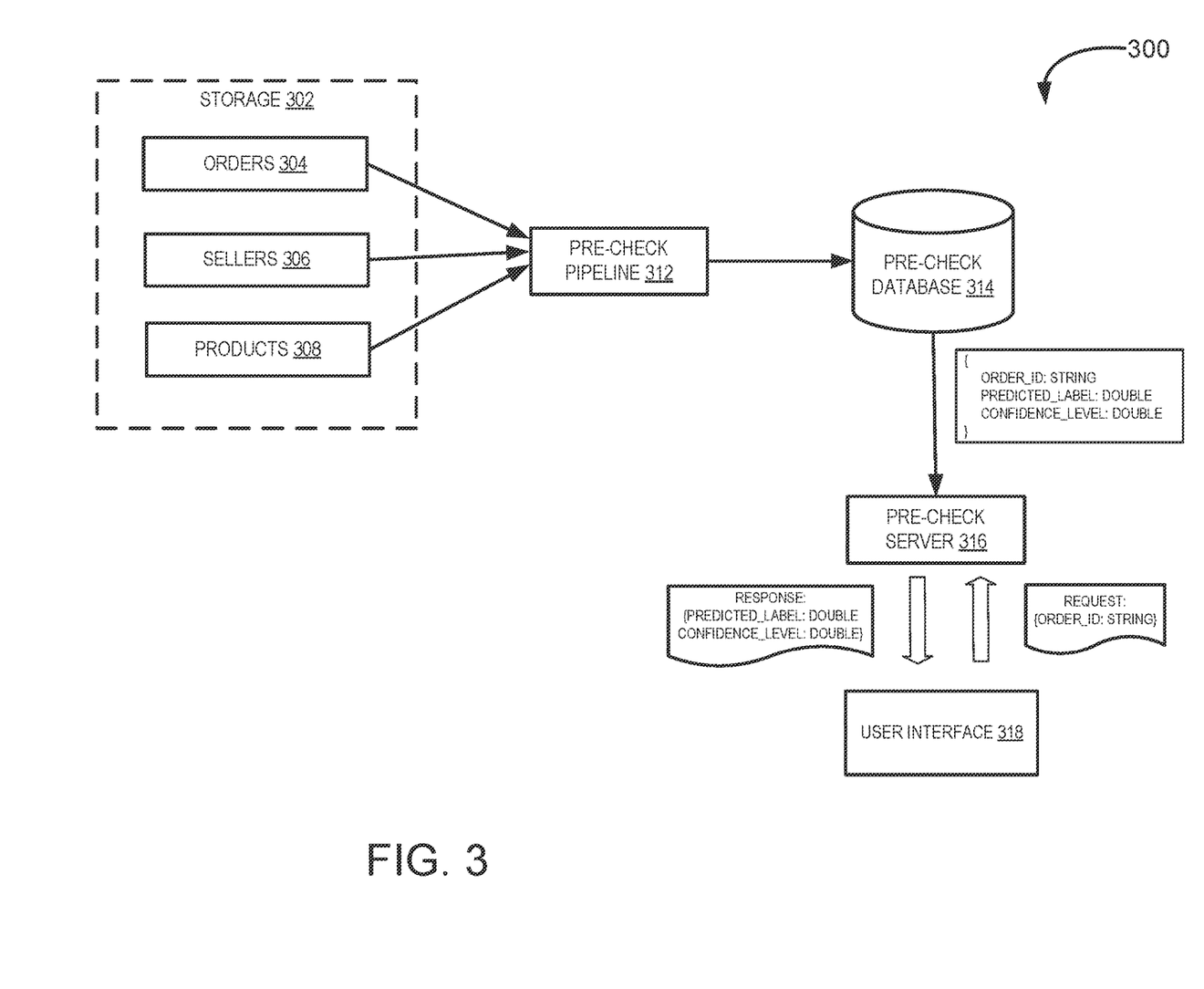
FIG. 3 is an example of a data flow in an object authenticity computing system, according to certain aspects of the present disclosure.

FIG. 3 is an example of a data flow 300 within the authentication system 118, according to certain aspects of the present disclosure. A storage component 302 of a computing system, such as a computing system 700 of FIG. 7, may store data associated with previous product orders and in-process product orders. The storage component 302 may also be the authentication data repository 122 as shown in FIG. 1 and the data associated with previous product orders and in-process product orders may be the historical online activity data 124 of FIG. 1. The storage component 302 may include information about orders 304, sellers 306, products 308 (the objects), or any other information relevant to a verification process for the products 308 (e.g., buyers). In an example, the products 308 may be verified to ensure authentication of the product, correct product sizes, that the product is free from manufacturer defects, and that the product is in an expected condition. Other verifications of the products 308 may also be performed.

In some examples, the storage component 302 may periodically adjust the data associated with product transactions. For example, additional information about the product may become available with additional automated verification techniques (e.g., adding image processing data regarding pictures of a box or a label of a product to determine authenticity, detecting a particular type of glue on the product from fumes using a chemical sensor, x-rays of the product, identifying common manufacturing defects associated with the product, etc.). Further, derived features may also be stored in the storage component 102. The derived features may include features that are not readily available in the datasets of the storage component 102. For example, a feature like "hour of the day a user is most active on the website" may be relevant to authenticity, but such a feature may require derivation from clickstream data of the user that is recorded within the website (e.g., the website provided by the host computing system 104).

The information stored in the storage component 302 may be provided to a pre-check pipeline 312. In an example, the pre-check pipeline 312 includes a machine-learning model that is trained on a corpus of data associated with a history of similar transactions. In an example, the machine-learning model of the pre-check pipeline 312 may be a gradient boosted tree ensemble. The output of such a machine-learning model may include an ensemble of prediction models, such as decision trees. For example, when the machine-learning model is applied to the information of the storage component 302, the output may be a label for each product of a transaction that is used to determine a level of scrutiny desired to verify the accuracy of the product or product transaction. In some examples, the output of the pre-check pipeline 312 may include an order identification number associated with a particular transaction, a predicted label for the verification of the particular transaction (e.g., fake or authentic), and an indication of the confidence level associated with the predicted label (e.g., as a percentage or as a set of confidence levels).

The output of the pre-check pipeline 312 may be stored at a pre-check database 314. The pre-check database 314 may be queried by a pre-check server 316 to provide results of the pre-check pipeline 312 to a user interface 318 (e.g., provided on the host computing system 104) or other end user system. An authenticity request that contains the identifier of the order (or an identifier of the product) can be submitted to the pre-check server 316. The pre-check server 316 queries the pre-check database 314 for results. In some examples, if the pre-check pipeline 312 has not been performed on the order or the associated product, the pre-check server 316 may request the pre-check pipeline 312 to be performed for the current order or product. After obtaining the results, the pre-check server 316 may return a response to the interface 318 that includes the predicted authenticity label or indicator and the confidence level. The user interface 318 may include a decision engine that executes rules related to the verification process to assign the products 308 associated with product transactions to various authentication streams associated with the labels assigned to the products 308. As discussed above, some of the products (e.g., with an authentic prediction and a high confidence level) may be assigned to an authentication stream with limited further verification processing, while other products (e.g., with a fake prediction and a high or low confidence level or an authentic prediction and a low confidence level) may be assigned to an authentication stream with high levels of verification scrutiny.

Data that impacts the output of the pre-check pipeline 312 may include the type of product associated with a product transaction. For example, a product transaction associated with a luxury brand may be more likely to involve a fake product than a product transaction associated with a non-luxury brand. Accordingly, the pre-check pipeline 312 may be more likely to label the luxury brand product as a fake product than the non-luxury brand product with the assumption that the remaining data associated with the product transactions and considered by the machine-learning model is equivalent. Additionally, when a seller is previously involved with a product transaction that was canceled or blocked due to the identification of a fake product or due to a product not being of an expected quality or condition, the pre-check pipeline 312 may also be more likely to label a product associated with the product transaction as a fake product when compared to similar transactions by different sellers without a record of canceled transactions. Other features associated with the product transactions may also be significant indicators to the machine-learning model that the products are potentially fake.

Figure 4:
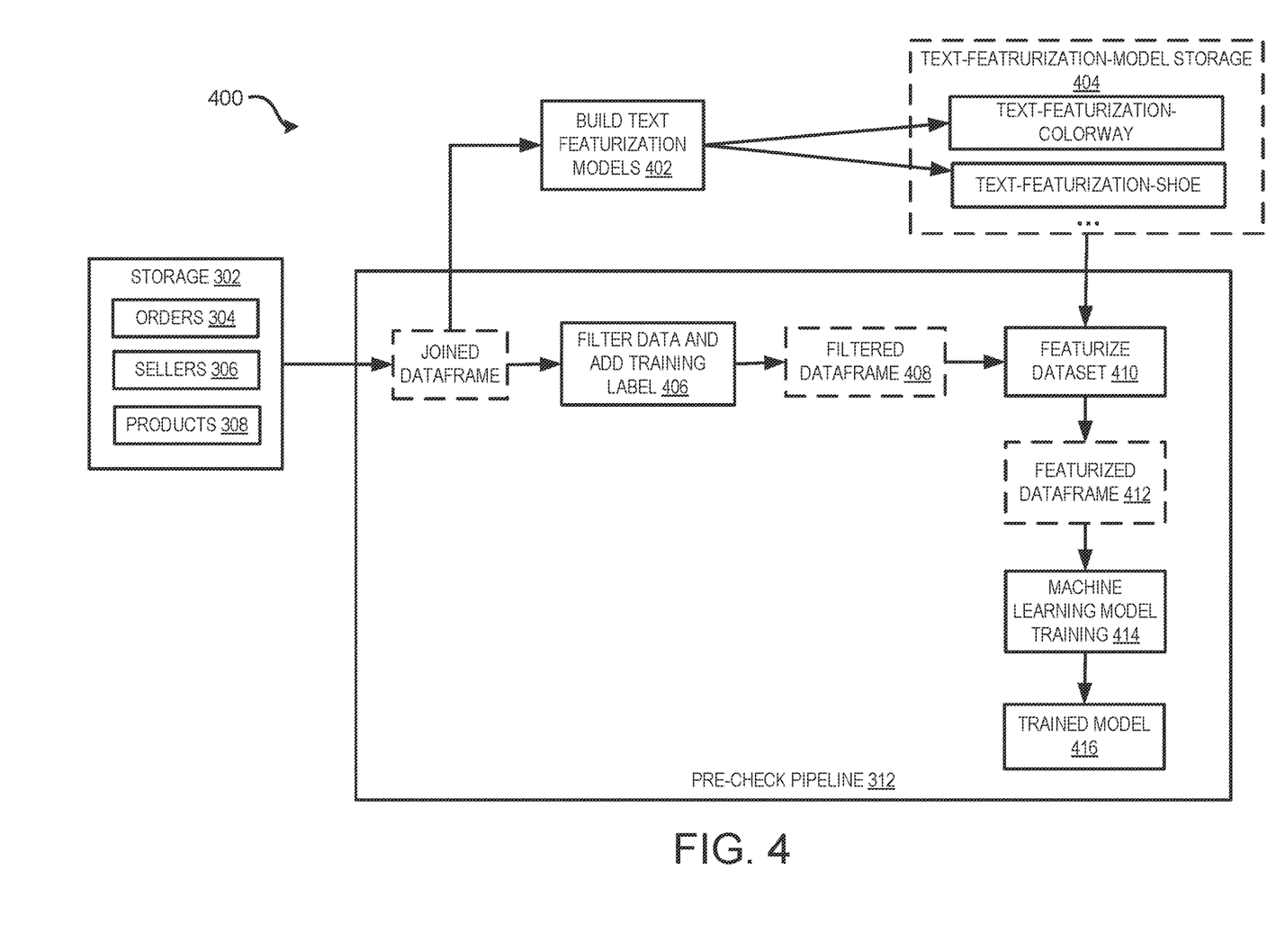
FIG. 4 is an example of data flow during model training and feature engineering, according to certain aspects of the present disclosure.

FIG. 4 is an example of data flow 400 of the sub-model training and feature engineering of the pre-check pipeline 312, in accordance with one or more examples. During a training process, the pre-check pipeline 312 accesses the information stored within the storage component 302. At block 402, the pre-check pipeline 312 provides the information from the storage component 302 to a text featurization module for training one or more text featurization models (e.g., word2vec models). The text featurization module may train the text featurization models using a corpus of information that is associated with previous product transactions and stored within the storage component 302. In some examples, the information provided to the text featurization module may be pre-processed using various filtering techniques on the corpus of information stored in the storage component 302. Further, duplicates in the corpus of information may also be removed during pre-processing and null values may be replaced with default strings. In some examples, the text featurization module may train the text featurization models after each instance that new sets of data are accessed by the pre-check pipeline 312. In additional examples, the text featurization module may train the text featurization models after a pre-set period of time regardless of when the data is accessed by the pre-check pipeline 312. The trained text featurization models may be stored in a text-featurization model storage 404 for use by the pre-check pipeline 312. For example, the text featurization models may provide a mechanism to transform words in the data, such as color or product type, into a vector representation of that word.

At block 406, the pre-check pipeline 312 may filter the information accessed from the storage component 302 and add training labels to the information to generate a filtered dataframe 408. In an example, the training labels added to the information may be indications of whether a transaction was completed or whether a transaction was blocked due to an issue with the verification process. For example, if the product is verified to be authentic and in the expected condition (e.g., correct size, correctly identified wear, correctly identified manufacturing defects) during the verification process, then the transaction is labeled as completed. If the product is not verified as being authentic or is not verified as being in the expected condition during the verification process, then the transaction may be canceled or blocked and labeled as incomplete.

The information stored in the filtered dataframe 408 may be featurized at block 410 using the text featurization models from the text-featurization model storage 404. For example, a text featurization model may be applied to the words in the data for the object to generate a vector representation of the words. Another text featurization model may be applied to the words in the data for the object to generate another vector representation of the words. This may generate a set of vectors in a featurized dataframe 412 that represent the data from the filtered dataframe 408. In some examples, the featurized dataframe 412 can be utilized as the model training samples 126 described above with respect to FIG. 1. At block 414, the machine-learning model that generates the pre-check predictions and confidence levels, as discussed above with respect to FIGS. 1-3, is trained using the vectors of the featurized dataframe 412. For example, the machine-learning model is trained to generate a trained machine-learning model 416 using input information (e.g., the vectors of the featurized dataframe 412) and the training labels to accurately generate predictions and confidence levels of subsequent transactions.

In some examples, the machine-learning model may be retrained periodically. For example, the machine-learning model may be retrained after a certain amount of time has passed since the previous training process. Further, accuracy of a retrained machine-learning model may be assessed to determine if the re-training process resulted in a more accurate model. If the re-trained model is less accurate than a previous iteration or within a specified accuracy threshold of the previous iteration, then the re-trained model may be discarded.

Several additional actions may be implemented to improve recall and precision of the pre-check pipeline 312. For example, featurization techniques may be improved (e.g., improving text featurization embedding, using a higher-dimensional encoding, using principal component analysis, etc.). Additionally, new product transaction data may be added to the pre-check pipeline 312 that contain stronger classification signals for identifying fake transactions (e.g., adding a "seller early payout boolean" to the input data). A "seller early payout boolean" may be a strong classification signal that a seller is attempting to sell a fake product or a product not matching an expected condition identified by the transaction. In an example, the early payout by a seller may occur when a seller moves money from an escrow account of a resell exchange system to a separate banking account within a specified period of time (e.g., within one or two days of the current transaction).

Further, improvements may be made to the machine-learning model by including a model that is less prone to overfitting, by adjusting hyperparameters of the model, or by increasing training data provided to the model during training operations. Moreover, a walk-forward cross-validation method may be implemented to validate the machine-learning model during training. Implementing such a technique may provide critical information on how to select the most appropriate retraining cadence for the machine-learning model while also providing a framework for hyperparameter tuning of the model. In some examples, the prediction and confidence threshold for the model are optimized using tools such as the Spark machine learning library (MLLib) to optimize for the recall of the model.

In various examples, the processes performed in the data flows 300 and 400 may be scheduled in a manner that orchestrates the processes without interference. For example, some of the processes described above may rely on the completion of other processes before they are able to begin. Various techniques may be used to schedule these processes. In an example, a specific workflow for each of the processes in the data flows 300 and 400 may be scheduled at regular intervals. Each process may be associated with a time period, where the time period provides a sufficient amount of time for each of the processes to be completed before the subsequent process begins.

Another scheduling technique may involve the use of step functions. The step functions may implement a directed analytic graph (DAG)-like operation over a variety of process in the data flows 300 and 400. For example, step functions may run across the DAG, which passes inputs to offloaded processes and passes outputs to the next step. This may enable a strong coupling between stages and conditional logic based on the inputs and outputs. Accordingly, the step functions may be triggered upon completion of a process rather than when a time period opens for a specific process.

Figure 5:
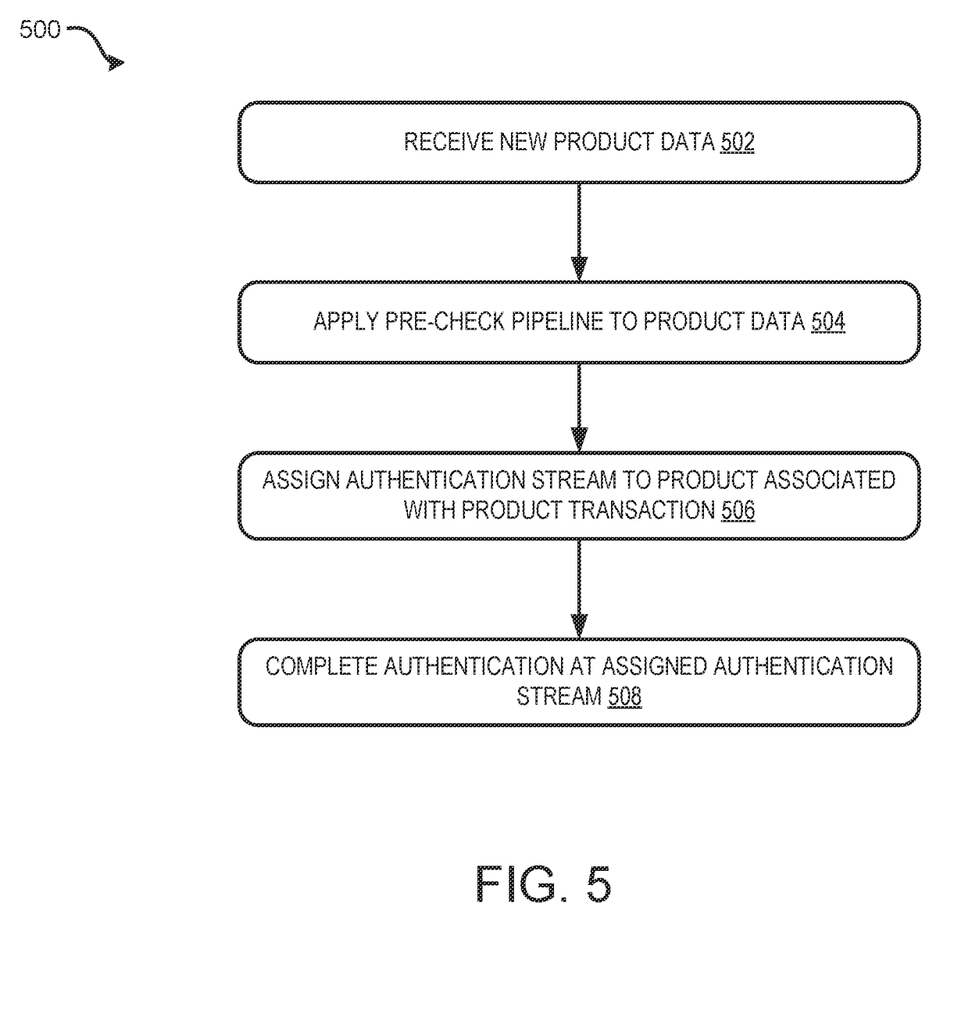
FIG. 5 is a flowchart of a process for authenticating a product of a product transaction, according to certain aspects of the present disclosure.

FIG. 5 is a flowchart of a process 500 for authenticating a product of a product transaction, in accordance with one or more examples. At block 502, the process 500 involves receiving or otherwise accessing new product data from the storage component 302. The new product data may include information associated with a new order 304, a seller of the product 306, the product itself 308, other relevant information (e.g., the buyer) or any combination thereof.

At block 504, the process 500 involves applying the pre-check pipeline 312 to the new product data. In some examples, the new product data is processed to generate a featurized dataframe that contains a set of vectors as input to the machine learning model. Generating the featurized dataframe for the new product data is similar to the process of generating featurized dataframe described above with respect to FIG. 4. Based on the featurized dataframe, the pre-check pipeline 312 may use a trained machine-learning model as discussed above with respect to FIGS. 3 and 4 to output a prediction, such as a likelihood of the product associated with the product data being authentic, and a confidence level, such as an indication of the confidence associated with the prediction.

At block 506, the process 500 involves assigning an authentication stream to the product associated with the product transaction. For example, a prediction from the pre-check pipeline 312 may indicate a likelihood of the product associated with the product transaction being authentic and a confidence level of that prediction. A high confidence level of a prediction that a product is authentic based on the known information about the product may result in assigning an authentication stream to the product with minimal additional scrutiny. Similarly, a high confidence level of a prediction that a product is fake based on the known information about the product may result in assigning an authentication stream to the product with extensive additional scrutiny. Lower confidence levels indicated for a prediction of an authentic product or a prediction of a fake product may also result in the assignment of an authentications stream with extensive additional scrutiny. In some examples, the level of scrutiny may be less for a prediction of an authentic product with a low confidence level than a prediction of a fake product with a high or a low confidence level.

At block 508, the process 500 involves completing the authentication process for the product at the assigned authentication stream. For example, the product may undergo a strenuous authentication process if the prediction is that the product is fake with a high level of certainty. Similarly, the product may undergo a limited authentication process if the prediction is that the product is authentic with a high level of certainty. Other indications of authenticity and certainty levels may result in various additional levels of scrutiny in other authentication streams. Upon completion of the authentication process of the product in the assigned authentication stream, the transaction may either be completed or canceled depending on the results of the authentication process.

Figure 6:
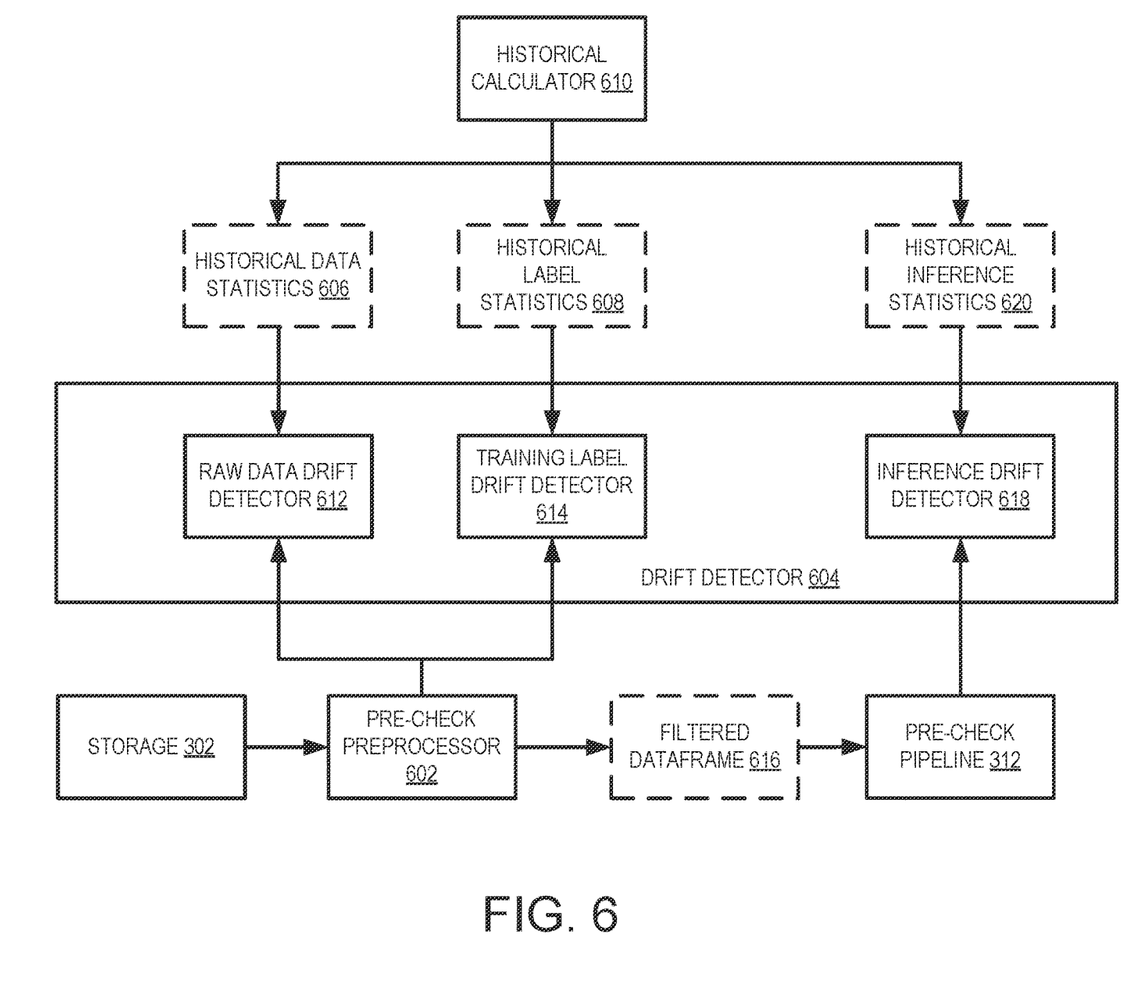
FIG. 6 is an example of data flow during a drift detection process of a pre-check pipeline, according to certain aspects of the present disclosure.

FIG. 6 is an example of data flow 600 during a drift detection process of the pre-check pipeline 312, in accordance with one or more examples. In some examples, the pre-check pipeline 312 may rely on drift detection to monitor and correct drift in data ingestion (e.g., accessing data from the storage component 302), prediction publishing (e.g., generating predictions and confidence levels at the pre-check pipeline 312), and in the server step (e.g., producing the prediction by the pre-check server 316). Changes in the system may be detected using the input data, the filtered and featurized data, and the output predictions.

In an example, the verification system includes a pre-check preprocessor 602 to filter and featurize the information stored in the storage component 302. Drift detection may be conducted prior to applying the pre-check pipeline 312 to new datasets that have been filtered and featurized by the pre-check preprocessor 602. For example, a drift detector 604 may rely on information associated with historical data statistics 606 (e.g., from raw data stored in the storage component 302) and historical label statistics 608 (e.g., from ground-truth labels applied to prior product transactions) when determining drift in the pre-check preprocessor 602. As shown, a historical calculator 610 may generate the historical data statistics 606 and the historical label statistics 608 used by a raw data drift detector 612 and a training label drift detector 614, respectively.

In some examples, the drift detection includes detecting concept drift and covariate shift. The concept drift is defined as the joint probability of X (e.g., feature vector) and y (label) changing at time t, such as $$t: P_t(X,y) != P_{t+1}(X,y) \tag{1}$$

Since $$P_t(X,y) = P_t(X) \times P_t(y|X) \tag{2}$$

There are three ways for the joint to drift: the prior probability of X, P(X) changes; the conditional probability of y on X, P (y|X) changes; both P (X) and P (y|X) change. The drift detector 604 can use the historical data statistics 606 and historical label statistics 608 to determine whether P (X), P (y|X), or both have changed more than a corresponding threshold value thereby detecting the drift. The covariate shift occurs when the distribution of the input data is different than the unseen data that the model attempts to predict.

In some examples, data drift of the new datasets may be the result of seasonality or drifts in the backend systems of the verification system. Such drift may provide indications to the verification system regarding how to address or correct the events. For example, the system may anticipate seasonal or other transitory drift based on historical information or adjust the backend system components to address a bug in the system. Another drift of the data may be associated with an external event, such as a television series or media exposure that may heavily influence data associated with certain products in the verification system. Messaging associated with the drift may be available to identify sources of the data drift and remediation steps, if any.

Upon completion of the drift detection of the new datasets, if the drift is detected (e.g., in the raw data, in the training label, or in the inference), the pre-check pipeline is prevented from making predictions using the new datasets until additional actions are taken. For example, a new or an updated model may be used to replace the existing model or further analysis on the data may be performed before restarting the pre-check pipeline. If no drift is detected, the information stored in the filtered dataframe 616 (which may be the filtered dataframe 408) may be provided to or accessed by the pre-check pipeline 312 to perform the prediction as discussed above.

Drift detection by an inference drift detector 618 may be used for deployment of a new or updated model in the pre-check pipeline 312. For example, the inference drift detector 618 may compare historical inference statistics 620 generated by the historical calculator 610 to new statistics of inferences output by the pre-check pipeline 312 based on the new datasets to detect drift. The inference statistics can include, but are not limited to, the mean and standard deviation of the fake rate, the mean and standard deviation of the authentic rate, and the mean and standard deviation of the confidence level. If the difference between the historical inference statistics 620 and the new statistics is larger than a threshold, the inference drift detector 618 may determine there is a drift, and a new model or updated model may be deployed.

In an example, the inference drift detector 618 may be used as a failure condition when deploying the new or updated model in the pre-check pipeline 312. For example, fake rates may fluctuate monthly, and it is desirable to avoid failing a model deployment in the pre-check pipeline 312 based on drift that represents an actual shift in the real-world fake rate. If the model is failed based on such real-world shifts, then the previous model may end up inaccurately predicting fake products. A threshold may be established by calculating a standard deviation of monthly fake rates over an extended period of product transaction data and confirming that the model does not produce predictions that skew beyond the standard deviation threshold in the fake rates.

Additionally, recall and precision for fake product predictions may be calculated regularly. Alarms in the system may provide alerts to drifts in the recall and precision in a real-world operation. This drift indicator in combination with the drift detection on the raw confidence scores when publishing inference data will enable a proactive approach to addressing drift in label distributions from the labeling associated with the pre-check server 316. For example, if the drift in the recall (or the precision) falls below a certain threshold, secondary models that are retrained frequently can be utilized in the event that the current machine learning model drifts.

In one example, a secondary model is retrained with the latest available data regularly, such as once per week. The new secondary model is then evaluated, for example, daily against the current model. Promotion (i.e., replacing the current model with the secondary mode) can occur in the event of the performance of the current model dropping below a threshold while the secondary model demonstrates sustained, superior performance. In some implementations, performance is measured by recall on fake transactions or inauthentic objects not used in training the model. In these implementations, promotion occurs when the secondary model demonstrates sustained, superior recall on fake transactions out-of-sample. The performance of a model may be measured using other metrics, such as the precision of the model. Promotion can be performed via tools such as those provided by the MLflow, where the deprecated model is transitioned to an "archived" state and the new model is promoted to the "production" state.

Figure 7:
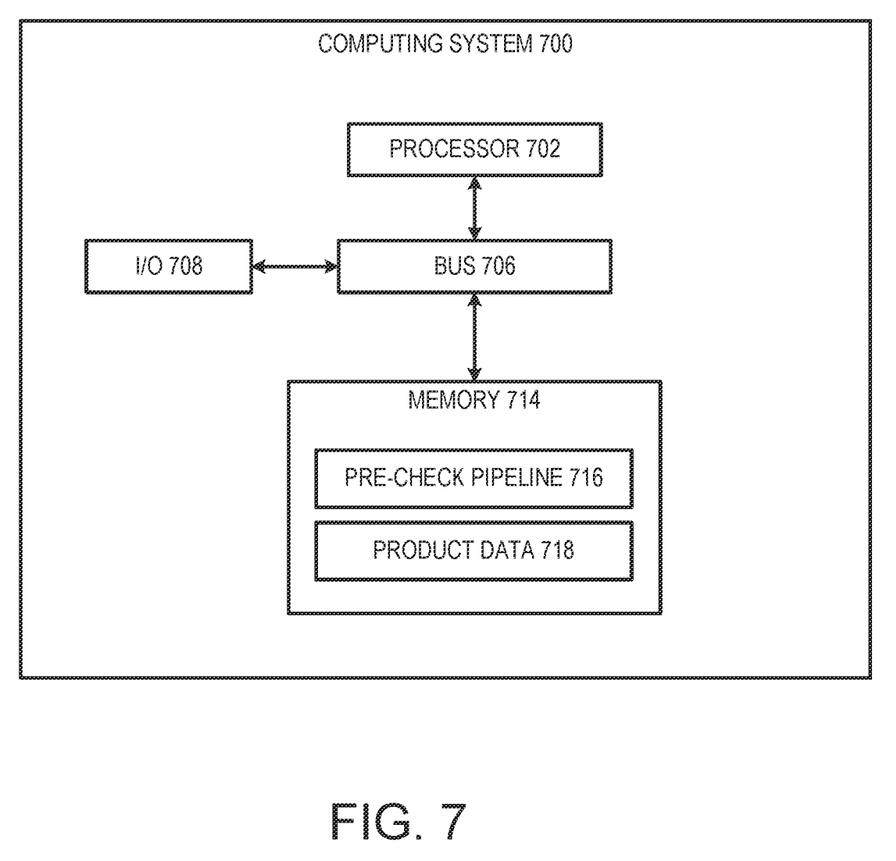
FIG. 7 is an example of a block diagram of components of a computing system suitable for implementing aspects of the techniques and technologies presented herein.

FIG. 7 is an example of a block diagram of components of a computing system 700, in accordance with one or more examples. Some or all of the components of a computing system 700 can perform the operations described above with respect to FIGS. 1-6. The computing system 700 includes one or more processors 702 communicatively coupled to one or more memory devices 714. The computing system 700 executes program code that configures the processor 702 to perform one or more of the operations described above with respect to FIGS. 1-6. For example, the memory devices 514 may include storage for a pre-check pipeline 716 and a product data 718. The program code of the pre-check pipeline 716, which can be in the form of non-transitory computer-executable instructions, can be resident in the memory device 714 or any suitable computer-readable medium and can be executed by the processor 702. Execution of such program code configures or causes the processor(s) 702 to perform the operations described herein with respect to authenticating objects using machine learning models as described above with respect to FIGS. 1-6. While FIG. 7 depicts the pre-check pipeline 716 and the product data 718 stored within the memory device 714, other applications associated with other actions described herein may replace the pre-check pipeline 716 and the product data 718 or be added to the pre-check pipeline 716 and the product data 718.

The computing system 700 may also include an input/output ("I/O") interface 508 that can receive input from input devices or provide output to output devices. The computing system 700 may also be able to communicate with one or more other computing devices or computer-readable data sources using the interface 708. Additionally, a bus 706 can also be included in the computing system 700. The bus 706 can communicatively couple one or more components of the computing system 700 and allow for communication between such components.

The subject matter of the presently disclosed examples is described herein with specificity to meet statutory requirements, but this description is not necessarily intended to limit the scope of the presently disclosed subject matter. The disclosed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The foregoing is provided for purposes of illustrating, explaining, and describing various examples. Having described these examples, it will be recognized by those of skill in the art that various modifications, alternative constructions, and equivalents may be used without departing from the spirit of what is disclosed. Different arrangements of the components depicted in the drawings or described above, as well as additional components and steps not shown or described, are possible. Certain features and subcombinations of features disclosed herein are useful and may be employed without reference to other features and subcombinations. Additionally, a number of well-known processes and elements have not been described in order to avoid unnecessarily obscuring the examples. Examples have been described for illustrative and not restrictive purposes, and alternative examples will become apparent to readers of this patent. Accordingly, examples are not limited to those described above or depicted in the drawings, and various modifications can be made without departing from the scope of the presently disclosed subject matter.

The invention claimed is:

1. A method that includes one or more processing devices performing operations comprising:
   accessing data associated with a target object involved in online activities;
   generating a featurized dataframe for the target object by processing the data associated with the target object;

applying a machine learning model to the featurized dataframe to determine an authenticity indicator for the target object, the authenticity indicator indicating a level of authenticity of the target object;

assigning the target object to an authentication stream among a plurality of authentication streams according to the authenticity indicator determined by the machine learning model, wherein the plurality of authentication streams comprises a first authentication stream with a first level of verification scrutiny and a second authentication stream with a second level of verification scrutiny, wherein the first level of verification scrutiny is lower than the second level of verification scrutiny, and wherein the target object is assigned to the first authentication stream in response to determining that the authenticity indicator indicates an authenticate object with a confidence level higher than a threshold value, and the target object is assigned to the second authentication stream in response to determining that the authenticity indicator indicates an authenticate object with the confidence level lower than the threshold value or the authenticity indicator indicates a fake object;

updating the authenticity indicator according to results returned from the assigned authentication stream; and causing the online activities involving the target object to be blocked or permitted according to the authenticity indicator.

2. The method of claim 1, wherein the featurized dataframe for the target object comprises at least a vector representation of data associated with the target object, and wherein generating the featurized dataframe for the target object comprises applying a text featurization model to words describing the target object.

3. The method of claim 2, wherein the text featurization model is trained using historical data about with a plurality of objects, a plurality of entities associated with the plurality of objects, or online activities involving the plurality of objects.

4. The method of claim 2, wherein the featurized dataframe for the target object comprises a second vector representation of the data associated with the target object, and wherein generating the featurized dataframe for the target object comprises applying a second text featurization model to the words describing the target object.

5. The method of claim 1, wherein the machine learning model is trained using historical data of a plurality of objects, a plurality of entities associated with the plurality of objects, or online activities involving the plurality of objects, and historical authentication results for the plurality of objects.

6. The method of claim 5, wherein the machine learning model is updated via an updating process, the updating process comprising:

calculating historical inference statistics based on predictions generated by the machine learning model from historical data;

calculating new inference statistics based on predictions generated by the machine learning model from new data;

comparing the historical inference statistics and the new inference statistics to determine a drift; and updating the machine learning model in response to determining the drift.

7. The method of claim 6, wherein the updating process further comprise:

training a second machine learning model;

determining that a performance of the second machine learning model is better than a performance of the machine learning model;

in response to determining that the performance of the second machine learning model is better than the performance of the machine learning model; and replacing the machine learning model with the second machine learning model.

8. The method of claim 7, wherein the performance of the machine learning model and the second machine learning model is measured by a recall on inauthentic objects, and wherein determining the performance of the second machine learning model is better than the performance of the machine learning model comprises determining that a recall of the second machine learning model on the inauthentic objects is higher than a recall of the machine learning model on the inauthentic objects.

9. A system, comprising:

one or more processing devices; and a non-transitory computer-readable storage medium communicatively coupled to the processing device, wherein the one or more processing devices are configured to execute program code stored in the non-transitory computer-readable storage medium and thereby perform operations comprising:

accessing data associated with a target object involved in online activities;

generating a featurized dataframe for the target object by processing the data associated with the target object;

applying a machine learning model to the featurized dataframe to determine an authenticity indicator for the target object, the authenticity indicator indicating a level of authenticity of the target object;

assigning the target object to an authentication stream among a plurality of authentication streams according to the authenticity indicator determined by the machine learning model, wherein the plurality of authentication streams comprises a first authentication stream with a first level of verification scrutiny and a second authentication stream with a second level of verification scrutiny, wherein the first level of verification scrutiny is lower than the second level of verification scrutiny, and wherein the target object is assigned to the first authentication stream in response to determining that the authenticity indicator indicates an authenticate object with a confidence level higher than a threshold value, and the target object is assigned to the second authentication stream in response to determining that the authenticity indicator indicates an authenticate object with the confidence level lower than the threshold value or the authenticity indicator indicates a fake object;

updating the authenticity indicator according to results returned from the assigned authentication stream; and causing the online activities involving the target object to be blocked or permitted according to the authenticity indicator.

10. The system of claim 9, wherein the featurized dataframe for the target object comprises at least a vector representation of words describing the target object, and wherein generating the featurized dataframe for the target object comprises applying a text featurization model to the words describing the target object.

11. The system of claim 9, wherein the machine learning model is trained using historical data of a plurality of objects, a plurality of entities associated with the plurality of objects, or online activities involving the plurality of objects, and historical authentication results for the plurality of objects.

12. The system of claim 11, wherein the machine learning model is updated via an updating process, the updating process comprising:
- calculating historical inference statistics based on predictions generated by the machine learning model from historical data;
- calculating new inference statistics based on predictions generated by the machine learning model from new data;
- comparing the historical inference statistics and the new inference statistics to determine a drift; and
- updating the machine learning model in response to determining the drift.

13. A non-transitory computer-readable storage medium storing executable program code configured to cause a processor to perform operations comprising:
- accessing data associated with a target object involved in online activities;
- generating a featurized dataframe for the target object by processing the data associated with the target object;
- applying a machine learning model to the featurized dataframe to determine an authenticity indicator for the target object, the authenticity indicator indicating a level of authenticity of the target object;
- assigning the target object to an authentication stream among a plurality of authentication streams according to the authenticity indicator determined by the machine learning model,
- wherein the plurality of authentication streams comprises a first authentication stream with a first level of verification scrutiny and a second authentication stream with a second level of verification scrutiny, wherein the first level of verification scrutiny is lower than the second level of verification scrutiny, and
- wherein the target object is assigned to the first authentication stream in response to determining that the authenticity indicator indicates an authenticate object with a confidence level higher than a threshold value, and the target object is assigned to the second authentication stream in response to determining that the authenticity indicator indicates an authenticate object with the confidence level lower than the threshold value or the authenticity indicator indicates a fake object;
- updating the authenticity indicator according to results returned from the assigned authentication stream; and
- causing the online activities involving the target object to be blocked or permitted according to the authenticity indicator.

14. The non-transitory computer-readable storage medium of claim 13, wherein the machine learning model is updated via an updating process, the updating process comprising:
- calculating historical inference statistics based on predictions generated by the machine learning model from historical data;
- calculating new inference statistics based on predictions generated by the machine learning model from new data;
- comparing the historical inference statistics and the new inference statistics to determine a drift; and
- updating the machine learning model in response to determining the drift.

* * * * *